United States Patent [19]

Tiffin

[11] 4,161,127
[45] Jul. 17, 1979

[54] REMOTELY OPERABLE PORTABLE BORING TOOL

[76] Inventor: Patrick L. Tiffin, 3030 McMillan Rd., San Luis Obispo, Calif. 93401

[21] Appl. No.: 786,119

[22] Filed: Apr. 8, 1977

[51] Int. Cl.² .................. B23B 5/36; B23B 3/26
[52] U.S. Cl. ........................ 82/1.4; 82/2 E; 82/4 R; 408/129
[58] Field of Search .......... 82/1.2, 1.4, 2 E, 82; 51/119; 90/13 C; 408/103–109, 129–131

[56] References Cited

U.S. PATENT DOCUMENTS

| 1,893,810 | 1/1933 | Travis | 408/131 |
|---|---|---|---|
| 2,486,977 | 11/1949 | Peters | 82/2 E |
| 3,187,247 | 6/1965 | Colten et al. | 90/13 C |
| 3,290,965 | 12/1966 | Gaev et al. | 82/1.4 |
| 3,383,957 | 5/1968 | McCann | 82/1.4 |
| 3,458,958 | 8/1969 | Douglas | 51/119 |
| 3,854,839 | 12/1974 | Gottelt | 408/129 |

Primary Examiner—Leonidas Vlachos
Attorney, Agent, or Firm—Wills, Green & Mueth

[57] ABSTRACT

A boring bar apparatus for removing material from the interior of a rigid structure through an elongated cylindrical opening therein. A bar mounted for rotation within the cylindrical opening carries a cutting head whose position relative to the opening can be independently varied radially and axially as the bar rotates. In this way, precision cuts can be made on otherwise inaccessible areas of the structure.

18 Claims, 27 Drawing Figures

REMOTELY OPERABLE PORTABLE BORING TOOL

BACKGROUND OF THE INVENTION

The device of the instant invention was developed to solve a problem currently confronting over 60 atomic power plants around the world. These plants were built by General Electric and incorporate a large volume of water surrounding the reactor itself. This water is contained within a large thermos bottle-shaped vessel having a wall consisting of a four and five-sixteenths inch thickness of carbon steel clad with an inner lining of one-fourth inch stainless steel. That wall is surrounded by a concrete revetment spaced therefrom a distance of forty inches. The water pipes supplying this reservoir are also lined with stainless steel, and pass horizontally through the steel wall. They terminate at the innermost surface of the vessel, where their circular intersection with the wall was initially hand ground to a slightly rounded edge.

The areas of circular intersection between the pipes and the inner surface of the vessel have developed cracks after prolonged use. Those cracks pose serious questions of safety and must be repaired. The cracked material must be removed to prevent further penetration of the cracks into the vessel.

Removal of the damaged material is complicated by radioactive conditions around the vessel. It must be accomplished from outside the inner wall because a person cannot safely enter the vessel to set up or operate a boring or milling machine. The closest access available is through the pipe itself from the forty-inch wide area between the wall and the revetment. For this, the pipe must be cut and the water sealed out. It should be noted here that an individual worker can be exposed to the radiation in this area for only a short time. Therefore, any tool used must be quickly set up and operated remotely.

Conventional boring tools are not sufficiently portable or versatile for this job. They are not only very bulky and complicated to assemble, but also lack sufficient remote adjustment capabilities to make the cuts required here. This adjustability is important in performing both the boring and facing operations.

SUMMARY OF THE INVENTION

Briefly, the present invention comprehends an improved boring bar apparatus for removing material from the interior of a rigid structure through a cylindrical opening therein, comprising a bar projecting into the cylindrical opening and mountable therein for rotation about the axis of that opening; a cutting heat adjustably mounted to the interior end of the bar for rotation therewith, the cutting head holding a cutting element adapted to remove material located within the essentially circular path defined by said element as the bar rotates; means for altering the radial position of the head relative to the bar as the bar rotates; and means for altering the axial position of the head relative to the opening as the bar rotates; the means for altering the radial and axial positions of the head being mutually independent in their operation and actuable from outside the opening.

These and other features make the invention particularly adapted to the removal of material from cracked water pipe openings in the interior surface of an atomic power plant water vessel. It is capable of making the blind and tapered facing cuts required adjacent to the inner surface of the vessel, the boring and tapering required on the inside of the pipe end and the rounding of the material at the circular region where those cuts intersect. This is accomplished by the features of independent and remote variability of the axial and radial positions of the cutting head while the bar rotates. The invention as claimed also incorporates other structure for this purpose including a rack and pinion mechanism for altering the radial position of the head, an axially fixed rotatable nut threaded onto the bar for imparting axial movement thereto, a structure facilitating dismantling and reassembly of the apparatus for installation in crowded areas and a plotting system for recording the radial and axial position of the cutting tool at all times.

It is an object of this invention to provide a versatile boring bar design for removing material from the interior of a rigid structure through a cylindrical opening therein.

It is also an object of the invention to provide a boring bar capable of working blind cuts, including facing cuts, in a radial direction through a cylindrical opening.

It is another object of the invention to provide a boring bar capable of being remotely controlled to perform a variety of cuts, including boring, facing, taper and radius cuts.

It is a further object of the invention to provide a boring bar which can be easily dismantled and reassembled in position to allow its use in confined spaces.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENTS OF THE INVENTION

Figure 1:
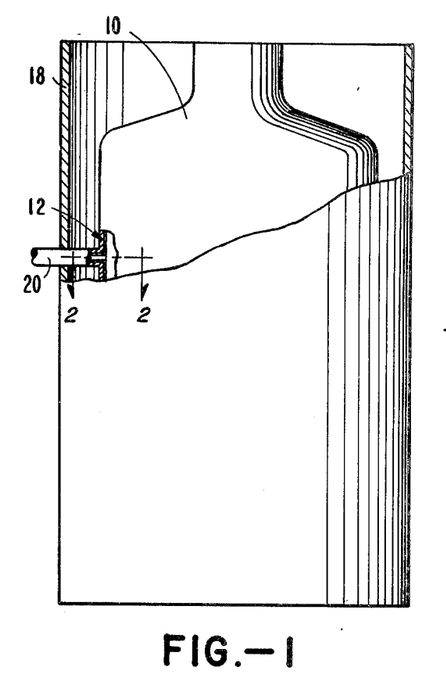
FIG. 1 is a schematic representation, partially broken away, of a vessel for holding the water which surrounds the reactor pile in an atomic power plant.

In FIG. 1, the bottle-shaped container 10 has a metal wall 12 made up of an outer layer of carbon steel 14 and an inner layer of stainless steel 16. Within container 10 there is positioned at the bottom the nuclear reactor (not shown). The container 10 is otherwise normally filled with water. External to and surrounding container 10 is concrete revetment 18. The container 10 is provided with one or more communicating pipes. For purposes of illustration of this invention there is shown a single such pipe 20, and all further discussion will be with respect to this single such pipe although it is to be understood that in actual practice container 10 will be provided with many such pipes, each of which will normally be treated in the manner described in this patent.

Figure 2:
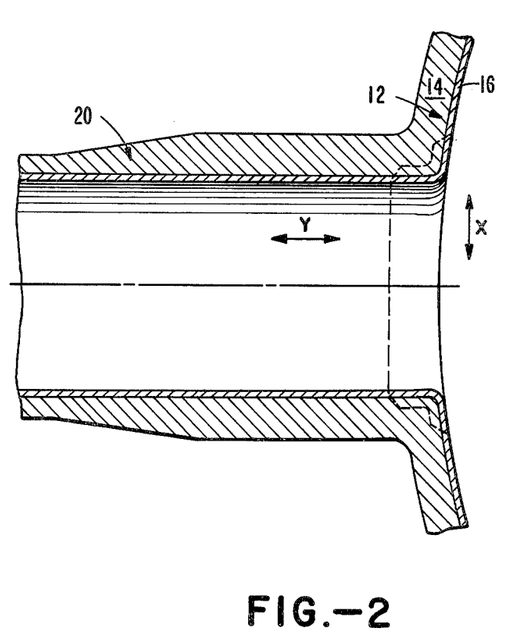
FIG. 2 is a fragmentary horizontal section taken along line 2—2 of FIG. 1.

As shown in FIG. 2, the wall composition of the pipe 20 is essentially the same as that of container 10. The device of this invention is adapted to remove the deteriorated metal shown by the dotted line in FIG. 2. It is also to be understood that the boring bar and cutting elements, described in detail below, will be inserted inside of pipe 20 by cutting an opening in pipe 20 adjacent the exterior of container 10 between the outside of container 10 and revetment 18.

While not directly relevant to this invention, the operations performed by the device of this invention is performed after a dry box (not shown) or similar structure has been positioned within container 10 and completely surrounding the juncture of pipe 20 with wall 12. The dry box is adapted with means for the removal of water from within the dry box and seals the area from the entry of water into the area from which metal is to be removed. In this way, it is possible to perform the repair operation without having to drain the water from container 10.

Figure 3:
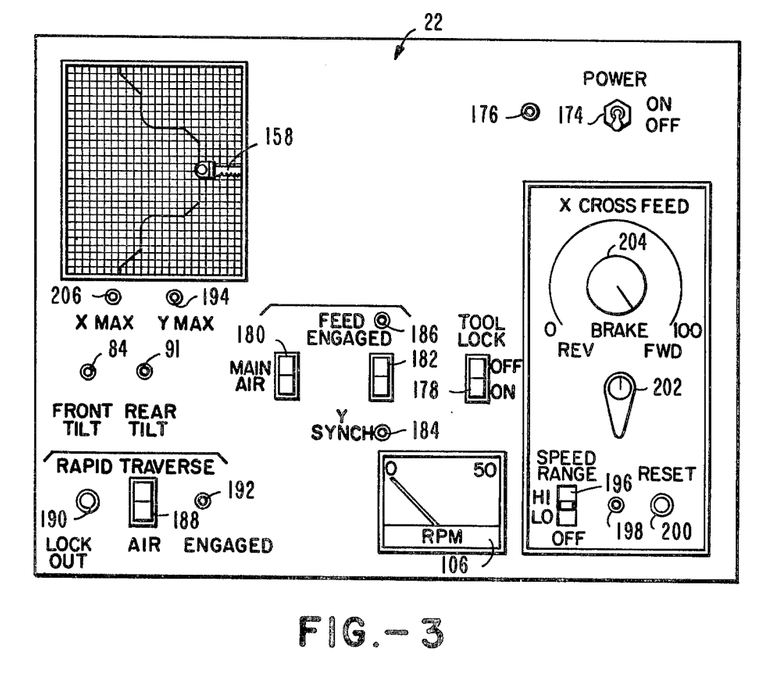
FIG. 3 is a plan view of a control console constructed in accordance with the invention.

Turning to FIG. 3, there is shown the main control panel for the device of the present invention. The control panel, indicated generally as 22, is normally positioned at a point remote from container 10 and revetment 18, and is adapted to permit remote operation of the device. As a result, once the boring bar and cutting portion of the device has been positioned within pipe 20, cutting operations can go forward without the need for any personnel in close proximity to a radioactive area.

Figure 4:
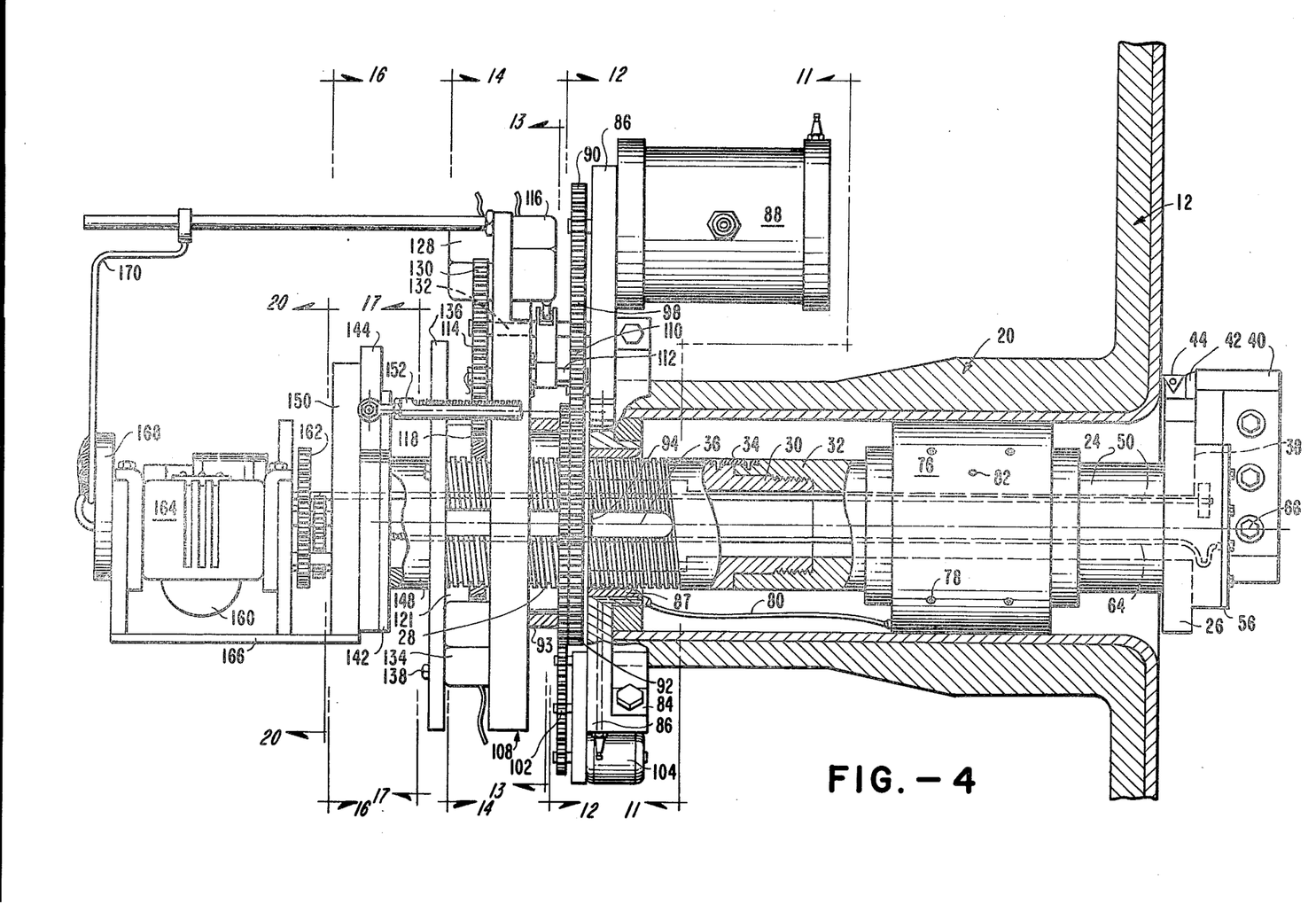
FIG. 4 is a longitudinal vertical section of a boring bar apparatus constructed in accordance with the invention.

The device of the present invention is provided with a boring bar 24 which is a generally hollow cylindrical member which is provided with an enlarged flange portion 26 at its one end, hereinafter referred to as the inner end of the boring bar. The other or outer end of the boring bar is provided with No. 4 pitch acme threads 28. The boring bar is separable into two portions which are joined by complementary interlocking male and female portions. The male portion 30 is provided with threads which are made up with threads on the female portion 32. The male and female members are restrained from inadvertent unthreading by the key element 34. The boring bar is separable into the two portions to facilitate its insertion into pipe 20 under the restricted space available between the exterior of container 10 and the concrete revetment 18. The exterior of the boring bar is also provided with an external groove 36 in the area of threads 20.

Figure 6A:
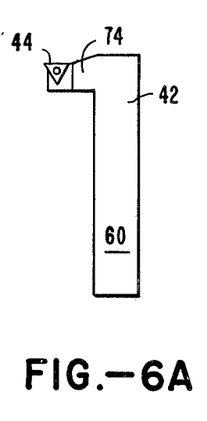
FIG. 6A is a side elevation of the facing tool element in accordance with the invention.
Figure 6B:
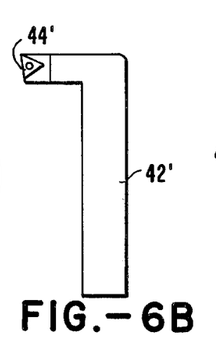
FIG. 6B is a side elevation of the boring tool element in accordance with this invention.
Figure 7:
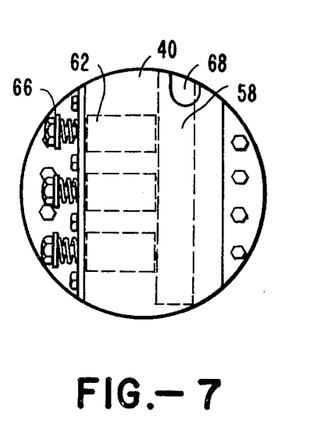
FIG. 7 is an end view of the bar end and cutting head assembly of the invention.
Figure 8:
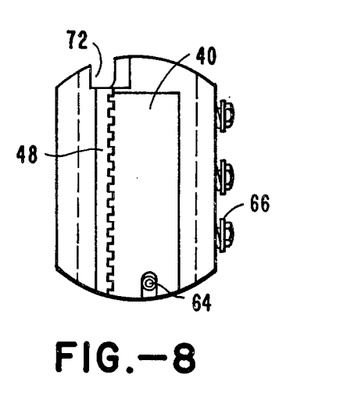
FIG. 8 is an end view of the tool holder element.
Figure 9:
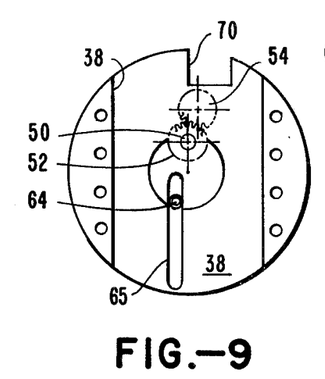
FIG. 9 is an end view flanged portion of the boring bar.

The flange 26 is provided with slot 38 which slidably receives tool holder 40. Tool holder 40 holds the cutting tool element 42 which terminates in the cutting point 44. It should be understood that in FIG. 6A the tool element is adapted to perform a facing operation. The tool element 42' and its cutting point 44' as shown in FIG. 6B is adapted to perform the boring function.

Figure 5:
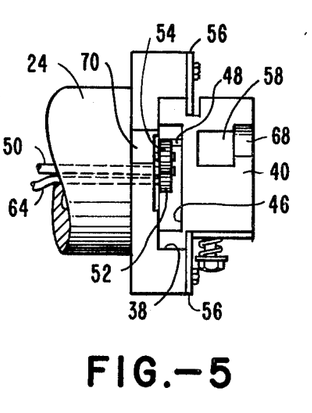
FIG. 5 is a plan view of the bar end and cutting head assembly of FIG. 4.

The arrangement of the tool holder 40 in the slot 38 of flange 26 is best shown in FIG. 5. As is shown there, the tool holder 40 is snugly and slidably received in the slot 38. The tool holder has a cavity 46 provided along its lengthwise surface with a rack 48. The hollow interior of boring bar 24 includes a drive shaft 50 which turns gear 52. Gear 52 in turn meshes with and turns gear 54. Gear 54 meshes with the rack 48. Thus, the tool holder 40 is made to slide within slot 38 by the rotation of shaft 50 which turns gears 52 and 54 to apply the force for sliding to the rack 48. The holder 40 is held in slot 30 by retainer plates 56.

The tool holder 40 is provided with a lengthwise opening 58 which receives the long portion 60 of the tool element 42. The tool element 42 is held in the lengthwise opening 58 by the operation of air actuated pistons 62 of conventional design. Air to these pistons is provided by a line 64. The air line 64 is flexible and is free to move within the elongated opening 65 in slot 38 so that the air line can follow the movement of the tool holder 40. The pistons are urged into lengthwise opening 50 when the tool element is in place, thereby securing the tool element. When air pressure is not present, the spring elements 66 serve to bias the pistons away from the tool element 42 so that the tool element can be manually withdrawn from the tool holder with the benefit of cutout 68. It will be understood that the slot 38 in flange 26 is provided with a cutout 70, and that tool holder 40 has a similar cutout 72. When the tool holder 40 is received in slot 38 the openings 70 and 72 are aligned and receive in recessed fashion the short portion 74 of the tool element 42 so that during the cutting operation only the cutting point 44 extends beyond the periphery of the combination of the tool holder 40. In operation the tool holder 40 can be moved outwardly in the X-direction, as shown in FIG. 2, by operation of the rack and gear to engage and remove metal by contact of the cutting point 44 with the metal.

The boring bar 24 is adapted to rotate within pipe 20 as hereinafter described. The inner end of the boring bar is supported for rotation within pipe 20 by the bearing assembly 76. The bearing assembly 76 is maintained in a stationary relationship with respect to the pipe 20 fore and aft by pairs of air-operated pistons 78, each pair of said pistons being at ninety degree intervals around the exterior of bearing assembly 76. The air-operated pistons are carried by the assembly and project outwardly to engage the inside wall of pipe 20 when air pressure is provided via line 80. The structure of these air pistons is conventional and will not be described in detail. The bearing assembly 76 is also provided with one or more mercury switches 82. The purpose of the mercury switches is to light up the "front tilt" light 84 on main control panel 22 in the event that the restraining influence of the pistons 78 were accidentally to be overcome, causing rotation or movement of the bearing assembly 76 within pipe 20.

Figure 10:
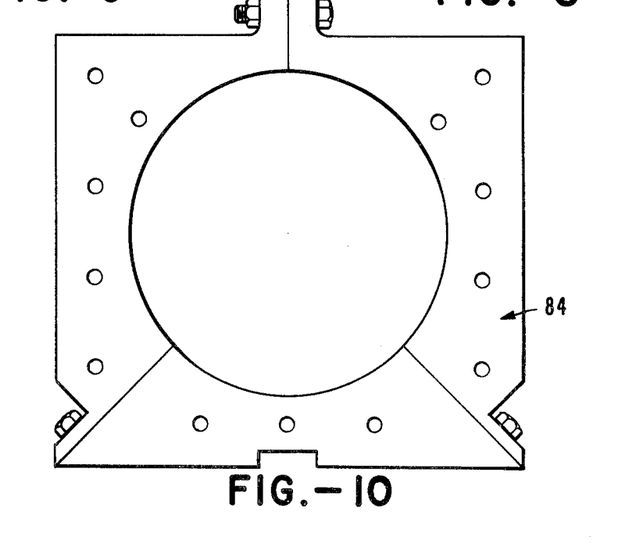
FIG. 10 is an end view of a clamp for attaching the device of this invention to the pipe.
Figure 11:
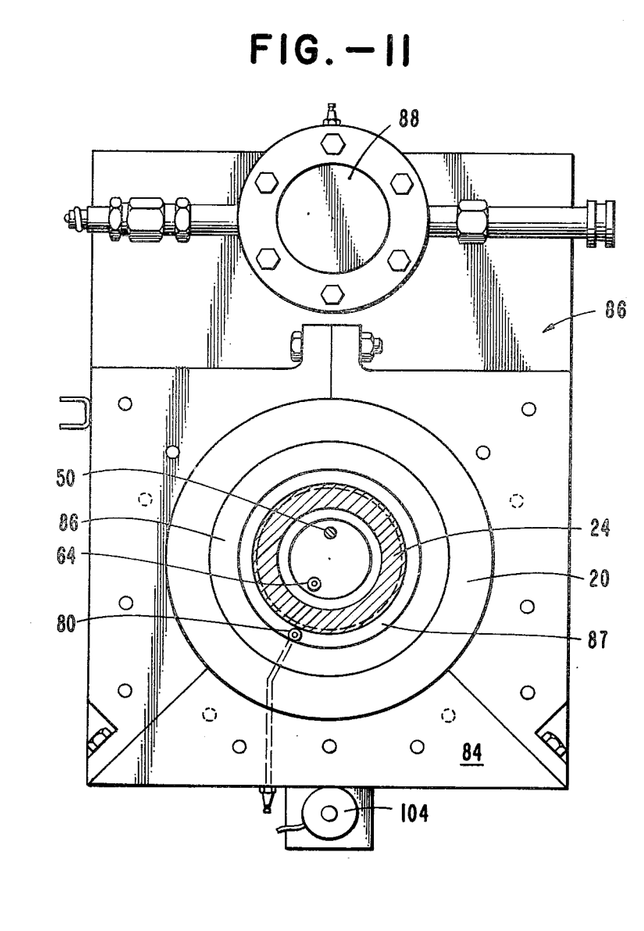
FIG. 11 is a vertical section taken along line 11—11 of FIG. 4.
Figure 12:
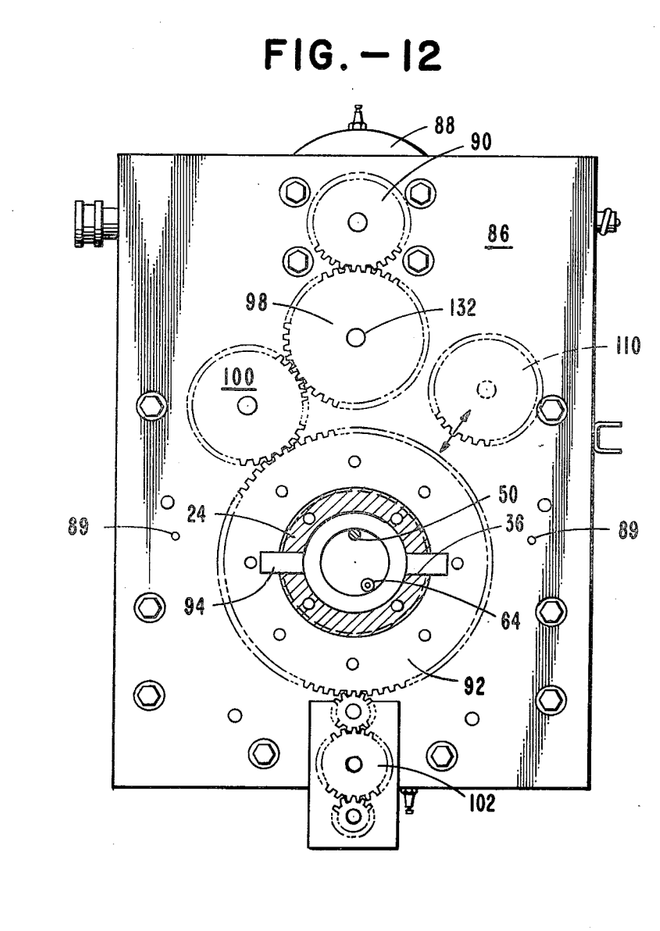
FIG. 12 is a vertical section taken along line 12—12 of FIG. 4.

At the outer end of pipe 20 there is provided the clamp 84 shown in FIG. 10. This clamp is snugly secured to the exterior of pipe 20, and the positioning of clamp 84 coincides with the free or cut-off outer end of pipe 20. Adjacent the clamp plate 84 is the main drive plate 86 which is bolted to clamp plate 84. Bushing 87 is carried by main drive plate 86 to support the outer portion of boring bar 24 for rotation. Main drive plate 86 also carries one or more mercury switches 89 for sensing any undesired rotation of that plate. In case of such rotation, "rear tilt" light 91 on control panel 22 is illuminated. The main drive plate 86 carries the main drive motor 88. The main drive motor 88 serves to drive the boring bar 24 in each of its three modes of operation. As is best shown in FIG. 12, the main drive motor 88 is provided with a drive gear 90. The boring bar 24 is provided with a ring 92 having an axial spacer 93. Ring 92 is secured to boring bar 24 by key elements 94 which are received in the external groove 36 in boring bar 24. The periphery of ring 92 has a plurality of teeth 90 thereabout. The main actuating plate 86 also carries gears 98 and 100 rotatable on stationary shafts. Thus, it can be seen that when main drive motor 88 is turned on, boring bar 24 is made to rotate via the gear train comprising gears 90, 92, 98 and 100.

Main drive plate 86 is also provided with another gear train 102 which drives the tachometer generator 104. The tachometer generator provides a signal which operates the tachometer readout 106 located on the control panel 22 providing a visual indication of the rotation speed of boring bar 24 during the operation of the device.

Figure 13:
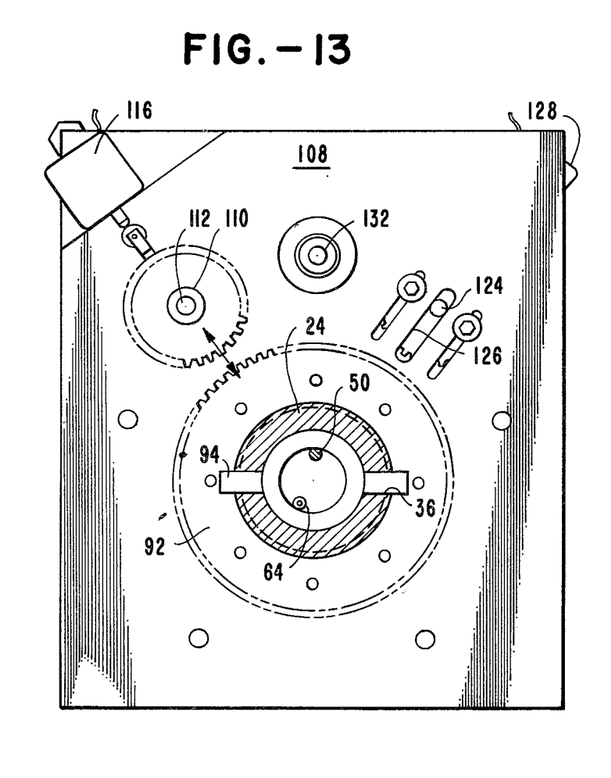
FIG. 13 is a vertical section taken along line 13—13 of FIG. 4.
Figure 14:
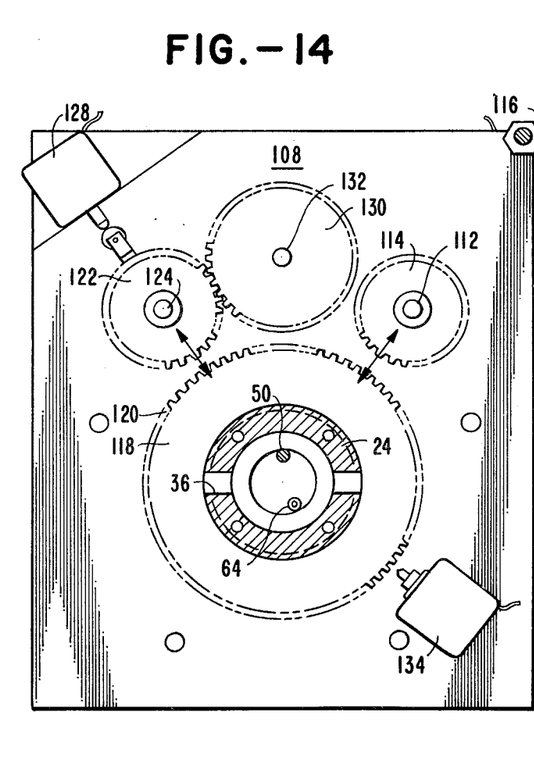
FIG. 14 is a vertical section taken along line 14—14 of FIG. 4.
Figure 15:
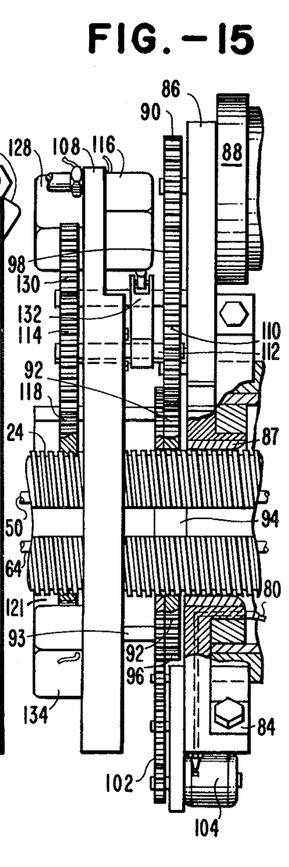
FIG. 15 is a fragmentary side elevation, partially broken away, showing the relationship of the elements shown in FIGS. 13 and 14 with respect to the boring bar.

Adjacent and secured to main drive plate 86 is main actuating plate 108. That side of the main actuating plate 108 facing the main drive plate 86 has extended therefrom Y-feed lockout gear 110. Y-feed lockout gear 110 is rotatable around a shaft 112 which is movable in the direction shown in FIG. 13. Shaft 112 extends through main actuating plate 108 and as is shown in FIG. 14, carries a second gear 114. Gears 110 and 114 are provided with exactly the same number of teeth at the same intervals. The shaft 112 is made to move in the directions indicated by air-operated piston unit 116. Gear 114 is adapted to be engaged with ring gear 118 which is threadably received on the No. 4 pitch acme thread 28 and is provided with peripheral teeth 120. The ring gear 118 also has a spacer 121 to locate it against axial movement in the assembled device.

When it is desired to cause the device to cut in the X-direction as shown in FIG. 2, the air-operated piston unit 116 causes the shaft 112 carrying the Y-feed lockout gear 110 and the gear 114 to move into engagement with gears 92 and 118 respectively. In this way, with the boring bar 24 being rotated by motor 88 as previously described, the ring gear 118 is continually rotated at exactly the same speed as boring bar 24 thereby precluding feed or movement of the boring bar 24 in the Y-direction of FIG. 2. This is due to the fact that gears 92 and 108 are of the same size and have the same number of teeth, and gears 110 and 114 are the same size and have the same number of teeth.

A Y-feed gear 122 is also carried by the main actuating plate 108. Y-feed gear 122 is carried by shaft 124 which is movable in the direction shown by the arrow in FIG. 14 which corresponds to the long dimension of the elongated slots 126 shown in FIG. 13. The movement of the Y-feed gear shaft 124 within slots 126 is provided by a separate air-operated piston unit 128. Intermediate or differential drive gear 130 is on a common shaft 132 with gear 98 however gear 130 has 41 teeth and gear 98 has 40 teeth so that when the Y-feed gear 122 is engaged with ring gear 118 and intermediate gear 130, with motor 88 turned on, the result is that ring gear 118 is turned slightly faster than the speed of rotation of boring bar 24 causing the boring bar 24 to advance or feed in the Y-direction as shown in FIG. 2. The rate of that advancement in this embodiment of the invention is 0.006 of an inch per revolution of boring bar 24 to allow the machining cuts to be made smoothly and efficiently.

A third air-operated piston unit 134 is adapted to engage the teeth 120 on ring gear 118. In this way, with gears 114 and 122 out of engagement with ring gear 118, the air-operated piston unit 134 prevents gear 118 from movement while the boring bar 24 is rotating providing for rapid advancement or traverse of the boring bar in the Y-direction within pipe 20. This allows the operator to rapidly move the tool holder axially either between boring cuts or during set-up. The boring bar can move at 0.250 of an inch per revolution of boring bar 24 in the rapid traverse mode.

Pentagonal plate 136 and bolts 138 which pass through main actuating plate 108 and fasten to main drive plate 86 maintain these elements in fixed relationship.

Figure 16:
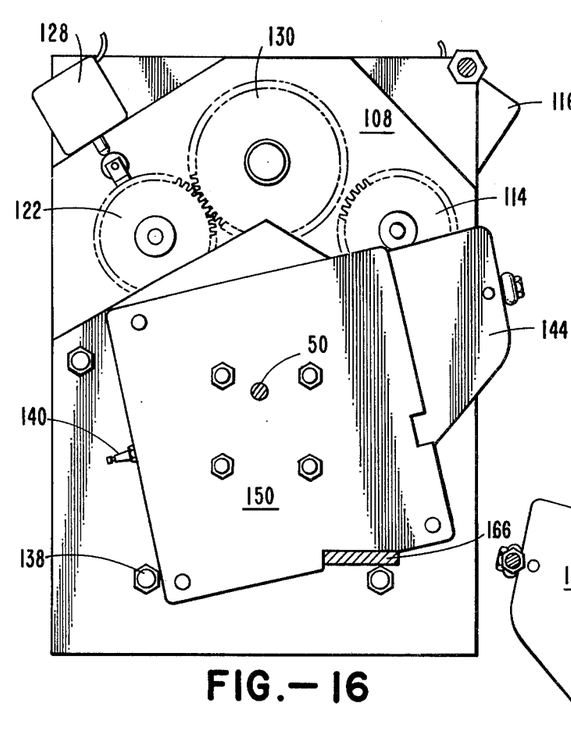
FIG. 16 is a vertical section taken along line 16—16 of FIG. 4.
Figure 17:
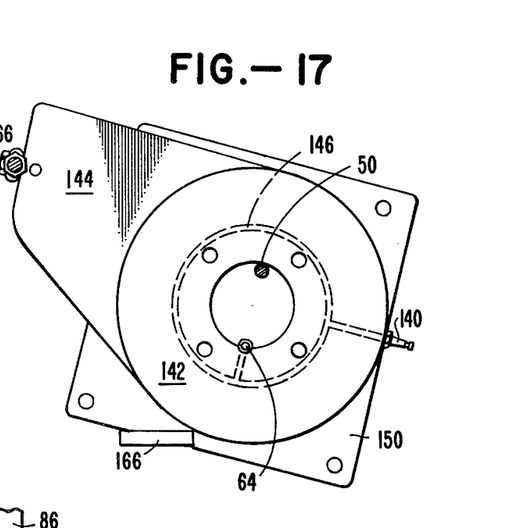
FIG. 17 is a vertical section taken along line 17—17 of FIG. 4.

As shown in FIGS. 16 and 17, the air for air line 64 which operates the pistons 62 on tool holder 40 is supplied via air inlet 140. The end of line 64 is connected to the rotatable disc-like member 142 which turns with boring bar 24. The air inlet 140 is connected to the stationary element 144. The air passages 146 indicated by the dotted lines in FIG. 17 are formed in stationary element 144. Gaskets (not shown) are provided between rotatable disc 142 and stationary element 144 whereby an airtight seal is maintained therebetween while pressurized air is continually supplied to line 64 from inlet 140.

As can be seen in FIG. 4, a spacer element 148 is provided between the end of boring bar 24 and rotatable disc 142. Obviously, spacer 148 rotates together with boring bar 24 and disc 142. Abutting the stationary element 144 is a square mounting member 150 which is connected to disc 142 for rotation therewith.

Figures 18, 19:
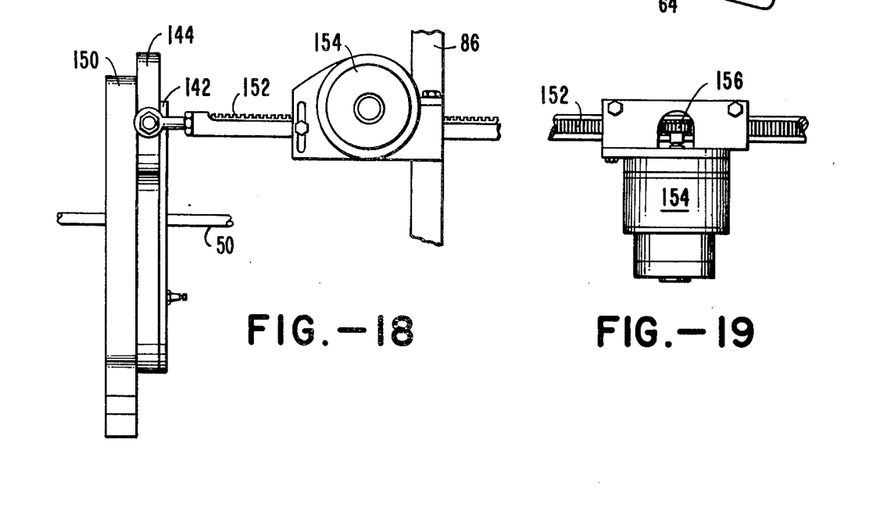
FIG. 18 is a fragmentary side elevation showing the structure of FIG. 17 in conjunction with the Y plotter generator.
FIG. 19 is a plan view of the Y plotter generator of FIG. 18.

A rack 152 is attached at one end to stationary element 144 and at the other end to main drive plate 86, as shown in FIG. 18. The rack 152 moves in unison with the movement of the boring bar 24 in the Y-direction. A selsyn motor generator 154 is held in a fixed position. The selsyn motor generator is connected to gear 156 which gear engages the teeth on rack 152. When the rack 152 and boring bar 24 move in the Y-direction with the selsyn motor generator 154 being stationary, rotation of gear 156 occurs which produces an electrical signal to a corresponding selsyn motor (not shown) on the underside of the main control panel 22, which motor provides the Y-movement input to plotter 158. This Y-movement at plotter 158 exactly corresponds in magnitude to the Y-movement of rack 152.

Figure 20:
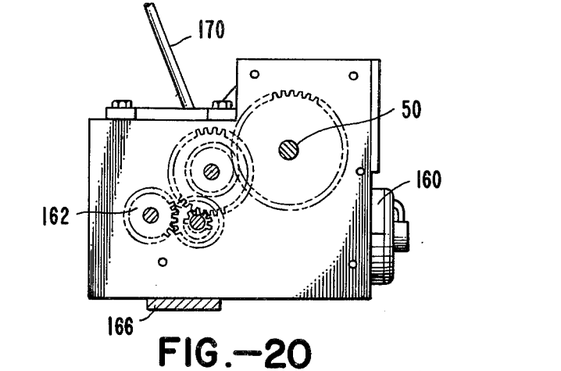
FIG. 20 is a vertical section taken along line 20—20 in FIG. 4.
Figures 21, 22:
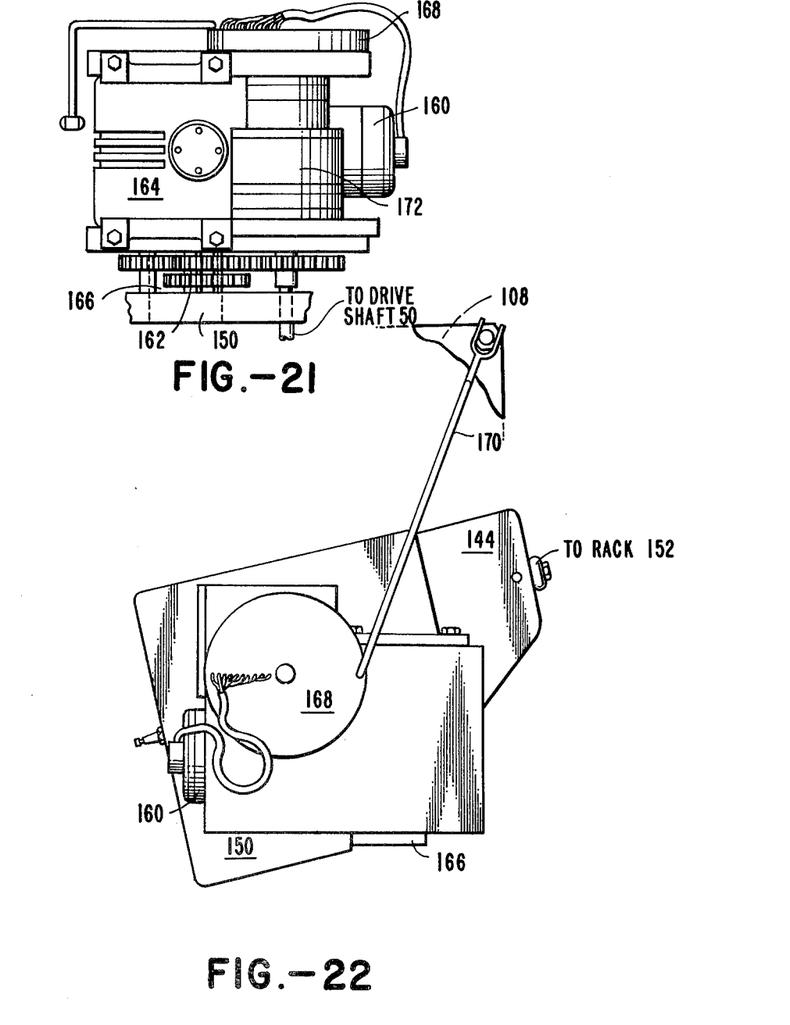
FIG. 21 is a plan view of the element shown in FIG. 20.
FIG. 22 is an end view of the element shown in FIGS. 20 and 21.

Turning to FIGS. 20 to 22, drive shaft 50 is driven by motor 160 through a gear train 162 which provides a maximum reduction of 37,500 to 1. Element 164 is a differential gear case providing the necessary change of direction so that the drive output from motor 160 is made to drive shaft 50 at right angles to the output of motor 160. It will be understood that motor 160, gear train 162, and differential 164 are held to rotatable mounting member 150 by bracket 166. Power to motor 160 is provided by electric slipper ring 168. Electric slipper ring 168 is restrained from rotational movement by yoke 170 which is connected to main actuating plate 108. The outside parts of slipper ring 168 has ten electrical contacts that slide simultaneously as the motor 160, gear train 162, and differential 164 rotate.

Rotatably carried along with motor 160 and other related structure just described, is another selsyn motor generator 172 which is connected by gears (not shown) to shaft 50, whereby rotation of shaft 50 causes a proportional output signal from the selsyn motor generator 172. Selsyn motor generator is electrically connected to a fourth selsyn motor which is positioned underneath main control panel 22. This fourth selsyn motor provides the X-direction input to plotter 158. The selsyn motor generator 172 is also powered through electric slipper ring 168. As will be apparent to those skilled in the art, the extent of rotation of shaft 50 is directly proportional to the movement of tool holder 40 and tool element 42 in the X-direction shown in FIG. 2. Since the movement of both of the X-directional selsyn motor generators is directly proportional to the extent of rotation of shaft 50, plotter 158 accurately reflects any X-directional movement of tool holder 40 and tool element 42. Further, because plotter 158 is provided with inputs which are proportional to both the X-direction movement of tool holder 40 and the Y-direction movement of boring bar 24, the tracings generated by plotter 158 reflect on an integrated basis the movements in both the X and Y-directions.

In operation, a remote control television camera is provided within the dry box. With the benefit of a remote receiver, the operator can see the relative position of the cutting point 44 on the wall 12 of container 10 adjacent to the point where pipe 20 enters container 10. This is the initial or start point. The operator then manually adjusts the position of plotter 158 so that it corresponds on control panel 22 to the position of the cutting point 44 relative to the pipe. The control panel 22 initially has a graph as shown which depicts the desired final contour of the metal after cutting. The start position of the plotter 158 is obviously displaced therefrom a distance which corresponds to the amount of metal to be removed. Once the start point has been established, the operator causes the device to cut away metal in the X and Y-directions by operation of the various pneumatic inputs previously described. The cutting operation is continuously traced on console 22, which enables the operator to operate the device to remove metal at precisely the desired locations within container 10 and pipe 20 until the desired amount of metal has been removed.

Referring now to control panel 22 in FIG. 3, its control of the operation of the device can best be seen in conjunction with the schematic air circuit diagrams of FIGS. 23 to 26. The air valves in those diagrams correspond generally to the switches on the panel 22. Each structure on the diagrams bears the number of the piston and cylinder arrangement whose activation places the device in that mode. The diagrams depict the air circuit of the device in each of its operational modes. Power switch 174 regulates the electrical power to the entire device. Light 176 is illuminated when the switch 174 is in the "on" position.

Figure 23:
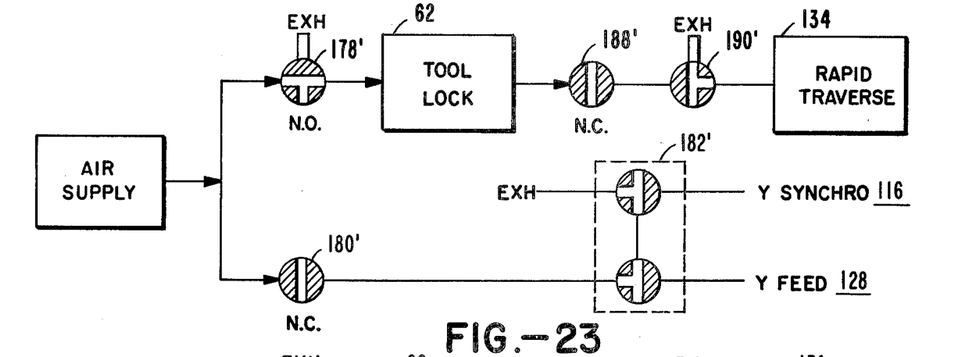
FIG. 23 is a flow chart of the pneumatic circuit of the invention in the tool lock mode.
Figure 24:
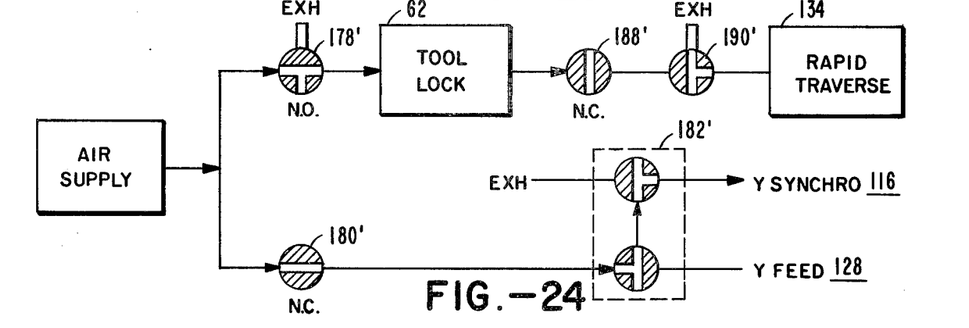
FIG. 24 is a flow chart of the pneumatic circuit of the invention in the Y synchro mode.
Figure 25:
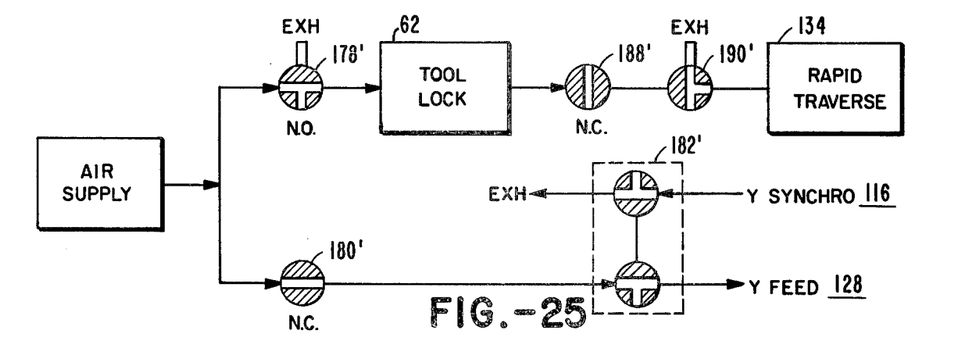
FIG. 25 is a flow chart of the pneumatic circuit of the invention in the Y feed mode.

In FIG. 23, TOOL LOCK is the only function which is activated. Tool lock switch 178 is an electrical switch operating the normally open solenoid air valve 178', and is shown in its open circuit "on" condition corresponding to activation of tool locking cylinders 62. When it is desired to remove the tool, movement of the switch 178 to its closed circuit "off" position closes valve 178', allowing pistons 62 to retract. Every other valve shown in FIG. 23 is in its normally closed position. It will be noted here that each of the schematic diagrams shows the tool in its locked position. FIG. 24 shows the device in its Y-SYNCHRO mode. Main air switch 180 is there turned "on" to open normally closed solenoid valve 180', and switch 182 is in its Y-SYNCHRO position, opening the passage of valve 182' leading to Y-SYNCHRO piston and cylinder 116. This causes ring gears 92 and 118 to move at exactly the same speeds, thereby preventing axial movement of boring bar 24 as discussed above. In this mode, Y-synchro light 184 is illuminated. FIG. 25 depicts the Y-FEED mode, in which the main air switch 180 remains "on" and the switch 182 is in its Y-feed position. This exhausts the Y-synchro passage of the valve 182' as it pressurizes the Y-feed passage, causing the piston and cylinder 116 to retract as the Y-feed piston and cylinder 128 urges the gear 122 into mesh with the gears 130 and 118. As discussed above, this causes the desired axial progression of boring bar 24 as it rotates. Y-feed light 180 is then illuminated. When the device reaches its point of maximum allowable axial travel in either direction, Y-max light 194 is illuminated. That light is controlled by a micro switch (not shown) attached to the plotting mechanism described above.

Figure 26:
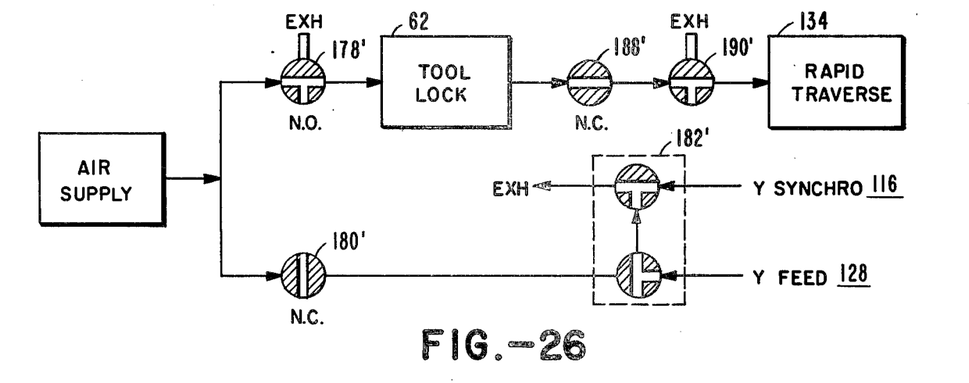
FIG. 26 is a flow chart of the pneumatic circuit of the invention in the rapid traverse mode.

FIG. 26 shows the RAPID TRAVERSE mode. Valve 180' is closed and both the Y-synchro and Y-feed mechanisms are opened to exhaust. Rapid traverse is actuated by turning on the air switch 188 to open normally closed air valve 188' and pressing lock out button 190 to open valve 190'. In this way, pressurized air is provided to the piston and cylinder arrangement 134 to prevent rotation of the ring gear 118 to provide rapid traverse of the boring bar 24 as described above. Light 192 is then illuminated. Button 190 must be depressed during any rapid traverse. If that button is let up, valve 190' immediately exhausts the piston and cylinder arrangement 134 to bring the device out of the rapid traverse mode. This is a safety feature to prevent damage to the pipe 20 or the device itself which might result from unintentionally activating rapid traverse.

Motor 160, which actuates tool holder 40 in the radial or X-direction through drive shaft 50, is controlled by the controls on the right hand side of control panel 22. The motor 160 is a variable speed, reversible electric motor. It is turned on and the speed range is selected by two-position switch 196. Light 198 indicates when the motor is on, and reset button 200 resets a circuit braker (not shown). Direction of rotation of motor 160 can be changed or the motor can be braked by rotation of three-position knob 202. The speed of movement is variable through knob 204. Maximum travel in the X-direction is indicated by illumination of light 206 which is operated by a microswitch in the plotting mechanism.

It will be understood that one of the principal features of the device of the instant invention is the fact that it can be broken down into a number of easily portable pieces which can be lowered into the area between the outside of the reactor wall and the revetment wall and easily assembled there into an operating device on the pipe. It is this portability and ease of assembly which enables the device to be used in the repair of atomic reactors.

Having fully described the invention, it is intended that it be limited only by the lawful scope of the appended claims.

I claim:

1. A boring bar apparatus for removing material from the interior of a rigid structure through a cylindrical opening therein, comprising:
   a bar projecting into said cylindrical opening and mountable therein for rotation about the axis of that opening;
   a cutting head adjustably mounted to said bar for rotation therewith, said cutting head holding a cutting element adapted to remove material located within the essentially circular path defined by said element as said bar rotates;
   means for altering the radial position of said cutting cutting head relative to said bar as said bar rotates; and
   means for altering the axial position of said cutting head relative to said opening as said bar rotates including a pair of radially oriented gears on said bar, one of said gears being a main drive gear keyed to said bar in a manner allowing it to slide axially therealong as it imparts rotational movement to that bar and the other of said gears being threaded thereon and clamped to said rigid structure to locate it axially relative to said structure, and a gear transmission engaging said gears to control the axial movement of said bar and hence said cutting head by controlling the rotational speed of said threaded gear relative to said main drive gear.

2. A boring bar apparatus as recited in claim 1, including an axial plotting system for recording the axial position of said head on an instrument remote from said bar.

3. A boring bar apparatus as recited in claim 2, in which said plotting system includes a pair of electrically connected selsyn motors, one of which is driven by the axial movement of said bar and the other of which drives an indicator on said instrument remote from said bar.

4. A boring bar apparatus as recited in claim 3, in which said means for altering the axial position of said cutting head is operable from a remote station.

5. A boring bar apparatus for removing material from the interior of a rigid structure through a cylindrical opening therein, comprising:
   a bar projecting into said cylindrical opening and mountable therein for rotation about the axis of that opening, said bar having an outer axially threaded surface portion;
   a cutting head adjustably mounted to said bar for rotation therewith, said cutting head holding a cutting element adapted to remove material located within the essentially circular path defined by said element as said bar rotates;
   means for altering the radial position of said cutting head relative to said bar as said bar rotates comprising a rack and pinion mechanism including a rack carried by said cutting head and a pinion engageable therewith which is carried by and rotatable relative to said bar such that rotational movement of said pinion relative to said bar causes a corresponding radial movement of said cutting head, an axially directed shaft carried rotatably within said bar and connected at one end to said pinion for imparting rotational movement thereto, and a radial drive assembly carried by said bar for rotation therewith and operably connected to said shaft for imparting relative rotational movement thereto; and
   means for altering the axial position of said cutting head relative to said opening as said bar rotates, including a radially oriented axial drive gear held against axial movement relative to said structure and having a threaded opening extending axially therethrough to engage said outer axially threaded surface portion of said bar, and gear transmission means operatively engaged with said axial drive gear and said bar for controlling the rotational speed of said nut relative to that of said bar to control the axial movement of said bar and hence said cutting head;
   said means for altering the radial and axial positions of said cutting head being mutually independent in their operation and actuable from outside said opening.

6. A boring bar apparatus as recited in claim 5 which includes a radially oriented main drive gear keyed to said bar in a manner allowing it to slide axially therealong as it imparts rotational movement to that bar, said main drive gear engaging said gear transmission for controlling the rotational speed of said axial drive gear relative to said bar.

7. A boring bar apparatus as recited in claim 6, in which said means for varying the radial and axial positions of said cutting head can be set to vary those positions at a desired constant rate, thereby resulting in a radial or axial progression, respectively, of the head as said bar rotates.

8. A boring bar apparatus as recited in claim 7 which includes both radial and axial plotting systems for recording the radial and axial positions respectively of said cutting head on an instrument remote from said bar.

9. A boring bar apparatus as recited in claim 8 in which said plotting systems include selsyn motors.

10. A boring bar apparatus as recited in claim 9 in which said means for altering both the radial and axial positions of said cutting head are operable from a remote station.

11. A boring bar apparatus as recited in claim 7, which includes a removable front bearing assembly carried by said bar near said cutting head and slidable into said cylindrical opening to locate that portion of the bar within said opening for rotation.

12. A boring bar apparatus as recited in claim 11, in which said removable bearing assembly includes a centering and retaining device in the form of a plurality of small pneumatic pistons mounted flush with the outer cylindrical surface of said bearing assembly and spaced thereabout, which pistons are actuable to project radially outwardly against said cylindrical opening and thereby center said bar within said opening.

13. A boring bar apparatus as recited in claim 12, in which said removable bearing assembly includes means for warning an operator in case said assembly tilts.

14. A boring bar apparatus as recited in claim 13, in which said means for warning an operator inlcudes a mercury switch.

15. A boring bar apparatus as recited in claim 7, in which said cutting element is adapted primarily to make a series of radial cuts.

16. A boring bar apparatus as recited in claim 7, in which said apparatus is adapted to be easily broken down and reassembled for transportation to and assembly in a particular opening.

17. A boring bar apparatus for removing material from the interior of a rigid structure through a cylindrical opening therein, comprising:
  a bar;
  bar mounting means including means for mounting said bar adjacent one end thereof to the interior of the cylindrical opening for rotation about the axis of that opening;
  a cutting head adjustably mounted to said bar for rotation therewith, said cutting head holding a cutting element adapted to remove material located within the essentially circular path defined by said element as said bar rotates;
  means for altering the radial position of said head relative to said bar as said bar rotates, comprising a rack and pinion mechanism wherein a rack carried by said head engages a pinion carried by and rotatable relative to said bar such that rotational movement of said pinion relative to said bar causes a corresponding radial movement of said head, an axially directed shaft carried rotatably within said bar and rigidly connected at one end to said pinion for axial rotation with said pinion, and a radial drive assembly including an electric motor carried by said bar for rotation with said bar to drive said shaft and said pinion for altering said radial position of said head; and
  means for altering the axial position of said head relative to said opening as said bar rotates;
  said means for altering said radial and axial positions of said head being mutually independent in their operation and actuable from outside said opening.

18. A boring bar apparatus as recited in claim 17, wherein said radial drive assembly further includes stationary means for producing a controlled electric signal able to power said electric motor to alter said radial position of said head, and an electric slipper ring between said stationary signal producing means and said electric motor to transmit said controlled signal to said electric motor.

* * * * *